United States Patent

[11] 3,570,589

| [72] | Inventor | Erwin Biesinger |
| | | Rottenburg, Germany |
| [21] | Appl. No. | 826,856 |
| [22] | Filed | May 22, 1969 |
| [45] | Patented | Mar. 16, 1971 |
| [32] | Priority | June 1, 1968 |
| [33] | | Germany |
| [31] | | P 17 60 546.8 |

[54] METHOD AND APPARATUS FOR RECOVERING SOLVENT VAPORS
10 Claims, 2 Drawing Figs.

[52] U.S. Cl. .................................................. 165/1, 165/105
[51] Int. Cl. .................................................. F28d 15/00
[50] Field of Search .......................................... 165/1, 71, 73, 105, 110, 111, 112, 113; 62/272; 237/66

[56] References Cited
UNITED STATES PATENTS

| 2,077,612 | 4/1937 | Besag ........................ | 237/66 |
| 2,756,028 | 7/1956 | Byerley ..................... | 165/113 |
| 3,271,934 | 9/1966 | Shields ...................... | 165/111 |

*Primary Examiner*—Charles Sukalo
*Attorney*—Michael S. Striker

ABSTRACT: A method and an apparatus for the recovery of solvent vapors. An air stream enriched with vapors of a volatile solvent is advanced in a predetermined path. Cooling means is interposed in the path and effects condensation of the solvent vapors in the stream. The resulting droplets of condensate descend into an upwardly open receptacle where they are accumulated to constitute a body of recovered solvent. A body of liquid of lesser specific weight and volatility than the solvent floats on the surface of the body of recovered solvent and seals the latter against contact with the ambient atmosphere to thereby prevent renewed vaporization of the recovered solvent pending reuse of the same.

Patented March 16, 1971

3,570,589

INVENTOR.
ERVIN BIESINGER
BY

3,570,589

METHOD AND APPARATUS FOR RECOVERING SOLVENT VAPORS

BACKGROUND OF THE INVENTION

The present invention relates generally to the treatment of solvents, and more particularly to the treatment of solvent vapors. Still more specifically, the invention relates to the recovery of solvent vapors and, in particular, to the recovery of solvent vapors which develop in dry cleaning apparatus.

A variety of different types of solvents are known for use in dry cleaning apparatus to dissolve and remove dirt and other contaminants from textiles. Most of these solvents have a very low flashpoint and readily volatilize at comparatively low temperatures. Particularly methane derivatives exhibit this property, and some of these will volatilize at room temperature. This of course renders the recovery of the solvent vapors originating in the response to such volatilization, rather difficult. On the other hand, such recovery is necessary for an economical operation of the apparatus using these solvents, such as dry cleaning apparatus.

Conventionally, such recovery is effected by withdrawing from the dry cleaning apparatus the solvent vapors which have developed therein and advancing a stream of air enriched with these solvent vapors into a closed housing containing cooling means. On contact with exposed surfaces of the cooling means, the solvent vapors in the stream of air condense and droplets of this condensate descend to the bottom of the housing. There is usually provided an inclined outlet channel or groove in the bottom wherein these droplets are accumulated and which communicates at or near its lowest point with an outlet opening.

Recovery apparatus of this type is effective only to a certain extent. That is to say, even if the vapor enriched air stream is passed through such apparatus repeatedly, only a certain percentage of the solvent vapors can be recovered if the recovery process is to be maintained within economically feasible limits. A major reason for the incomplete recovery is the fact that the air stream passing through the housing must of course leave the same again and in so doing passes over the bottom wall of the housing onto which the droplets of solvent condensate have descended. The result is that a rather large percentage of the solvent which has been accumulated in form of droplets on the bottom wall of the housing — and which is highly volatile, as must be remembered — will again vaporize and be carried out of the housing by the airstream.

This impossibility of effecting more satisfactory recovery within economically feasible limits is particularly disadvantageous because the more highly volatile solvents, which are preferred for modern dry cleaning uses, are relatively expensive.

SUMMARY OF THE INVENTION

It is, accordingly, an object of the present invention to overcome the aforementioned disadvantages.

More particularly, it is an object of the present invention to provide an improved method of recovering solvent vapors.

Still more specifically, it is an object of the present invention to provide a method of recovering solvent vapors which permits the recovery of considerably larger percentages of solvent vapors than was heretofore possible.

A concomitant object of the present invention is to provide such a method which requires less time, or at least no more time than heretofore necessary for effecting the recovery of solvent vapors, but which will produce the aforementioned increase in the recovery percentage.

Still a further object of the present invention is to provide such a method wherein the renewed vaporization of the recovered solvent is completely or almost completely prevented.

A further object of the invention is to provide an apparatus for carrying out the novel method.

In pursuance of the above objects, and others which will become apparent hereafter, one feature of my invention resides in a method of recovering solvent vapors, according to which method I guide in a predetermined path a stream of air enriched with vapors of a volatile solvent having a given specific weight. In this path, the stream is cooled and thereby condensation of the vapor is effected in form of droplets which descend under the influence of gravity. The descending droplets of condensate are collected to form a body of recovered solvent. A layer of a liquid less volatile than the solvent and having a lesser specific weight than the same, floats on top of the body of recovered solvent to thereby prevent contact of the same with the ambient atmosphere and prevent, or at least substantially inhibit, renewed vaporization of the recovered solvent pending the reuse thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
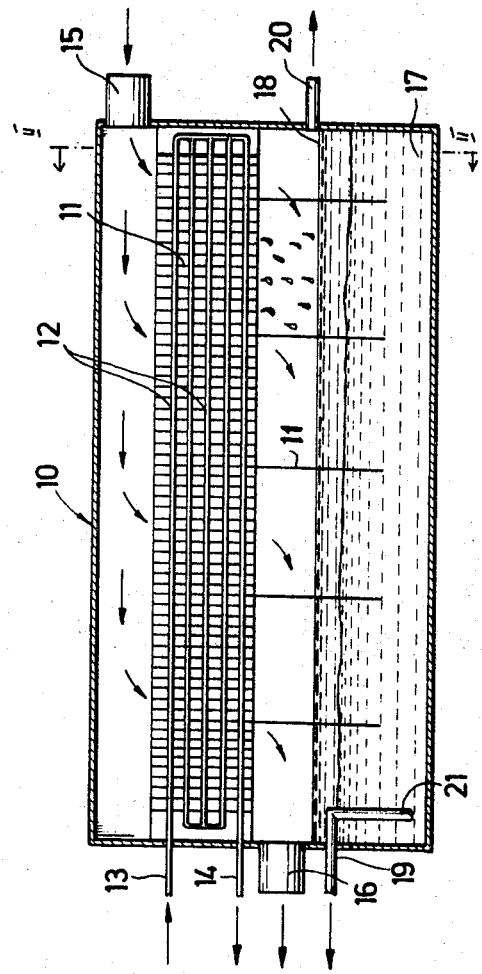
FIG. 1 is a diagrammatic vertical longitudinal cross section through an apparatus according to my invention.

Discussing now the drawing in detail, it will be seen that the apparatus according to my invention — which is illustrated only diagrammatically but in a manner thought to be adequate to a complete understanding — comprises a closed housing 10 in the interior of which there is provided cooling means constituted by a set or block of cooling fins 11 through which tubes 12 extend which carry a cooling fluid. Elements 11 and 12 together thus constitute heat-exchange means. Such heat-exchange means is known and need not be further described in detail. Reference numeral 13 identifies an inlet for cooling fluid into the tubes 12 and reference numeral 14 identifies an outlet for the spent cooling fluid. Because the tubes 12 are of course in heat-exchanging contact with the cooling fins 11 in known manner, the latter are cooled. The manner in which coolant is circulated to and through the tubes 12, and is returned to a refrigeration apparatus of suitable type for recooling, is well known and need not be further described. In any case, it does not constitute a part of the present invention.

Reference numeral 15 identifies an inlet communicating with the interior of the housing 10 and reference numeral 16 an outlet. A stream of air enriched with solvent vapors withdrawn from a user apparatus, that is in the exemplary embodiment from a nonillustrated conventional dry cleaning apparatus, is advanced in suitable manner — as by a blower or the like — through the inlet 15 into the interior of the housing 10 which, it will be appreciated, constitutes guide means for the stream. The stream of air carrying the solvent vapors leaves the housing 10 through the outlet 16. On its way to this outlet it must, however, pass over and around the heat-exchange means 11, 12, as indicated by the arrows shown within the interior of the housing 10. In so doing, the solvent vapors are subjected to the cooling action of the heat-exchanger and the solvent vapors become condensed on contact with the exposed surfaces of the cooling fins 11 and form thereon as condensate droplets which descent or drip under the influence of gravity into the lower portion of the housing 10.

As shown, the lower portion of the housing 10 is formed as an upwardly open receptacle 17 into which the droplets of condensate shower, as illustrated in FIG. 1.

In accordance with my invention, a body of liquid having a lesser specific weight and lesser volatility than the solvent is accommodated in the interior of the receptacle 17. This body of liquid, which advantageously may be water, floats on the surface of the accumulating recovered solvent in form of a layer 18, because of its lesser specific weight. The droplets of condensate, descending from the cooling fins 11, either penetrate through the layer 18 immediately on impact because of their weight, or else descent through the layer 18 because of their greater specific weight. In any case, the layer 18 seals the accumulated body of recovered condensate against contact with the ambient atmosphere, and of course against contact with the airstream passing from inlet 15 to outlet 16, and therefore prevents or at least significantly inhibits renewed vaporization of the recovered condensate. Because during their descent the droplets of condensate are still rather cool, there is little or no danger that they could undergo vaporization prior to passage through the layer 18, that is while they are exposed intermediate the layer 18 and the cooling fins 11 to the airstream.

Figure 2:
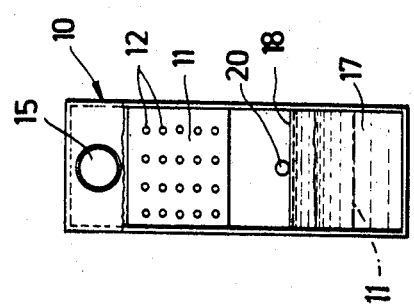
FIG. 2 is a diagrammatic section taken on the line II-II of FIG. 1.

In the illustrated embodiment, quantities of the recovered solvent in excess of a predetermined amount are continuously withdrawn through an overflow arrangement. For this purpose, there is provided an overflow conduit 19 located at a predetermined level of the receptacle 17 and having a riser conduit 19 which communicates with the overflow conduit 19 and whose inlet 21 is located at a lower level adjacent the bottom wall of the receptacle 17. Thus, as soon as the level of recovered condensate in the receptacle 17 reaches the level of the outlet conduit 19, any additional quantities of recovered solvent will be evacuated through the outlet conduit 19 in well-known manner. From there, they may of course be suitably conveyed to a collecting receptacle. A second conduit 20 communicates with the receptacle 17 at a level about that of the conduit 19. It is also shown in FIG. 2. The purpose of the conduit 20 is to evacuate and/or add water. The difference between the levels of the conduits 19 and 20 determines the thickness of the water layer 18. If no water is to be added, or if no water must be evacuated, the conduit 20 may be closed in suitable manner to prevent an escape of air still enriched with solvent vapors.

In accordance with a further concept of the invention, some or all of the cooling fins 11 may extend downwardly to such a level as to be partly immersed in the recovered solvent contained in the receptacle 17. This is shown in FIG. 1 on hand of some of the fins 11 and it will be seen that they extend through the layer 18 of water and into the solvent contained in the receptacle 17. The purpose of this is to provide additional cooling of the recovered solvent on the one hand, and on the other hand to prevent turbulence in the protective layer 18 of water as a result of the airstream flowing from the inlet 15 to the outlet 16 or as a result of vibration or impacts to which the housing 10 may be subjected. Evidently, such turbulence might at times expose portions of the surface of the recovered solvent to the airstream with undesirable vaporization and removal by the airstream of part of the recovered solvent.

It will be understood that each of the elements described above, or two or more together, may also find a useful application in other types of applications differing from the types described above.

While the invention has been illustrated and described as embodied in an apparatus for recovery of solvent vapors, it is not intended to be limited to the details shown, since various modifications and structural changes may be made without departing in any way from the spirit of the present invention.

I claim:

1. Apparatus for the recovery of solvent vapors, comprising in combination, guide means for guiding in a predetermined path a stream of air enriched with vapors of a volatile solvent having a given specific weight; cooling means interposed in said path for effecting condensation of the solvent vapors in said stream so that the resulting droplets of condensate descend from said cooling means under the influence of gravity; upwardly open receptacle means arranged below said cooling means for receiving said droplets of condensate; and a body of liquid of lesser specific weight and volatility accommodated in said receptacle means so as to float on and prevent renewed vaporization of the condensate descending from said cooling means and accumulating in said receptacle means.

2. Apparatus as defined in claim 1, said guide means and said receptacle means respectively constituting the upper and the lower part of a housing, and said cooling means being arranged in said housing.

3. Apparatus as defined in claim 1, wherein said liquid is water.

4. Apparatus as defined in claim 1, said body of liquid floating on the accumulated condensate in form of a layer of liquid; and further comprising maintaining means for maintaining the layer of liquid at a predetermined thickness.

5. Apparatus as defined in claim 4, said maintaining means being operative for maintaining said layer of liquid at said predetermined thickness in dependence upon the level of the accumulated condensate in said receptacle means.

6. Apparatus as defined in claim 5, said maintaining means comprising first overflow means having an inlet proximal to a bottom wall of said receptacle means and an outlet at a first level above said inlet, and second overflow means having an inlet and outlet at a second level above said first level.

7. Apparatus as defined in claim 1, said cooling means comprising a plurality of cooling members each having exposed surfaces on which said solvent vapors condense into droplets of condensate.

8. Apparatus as defined in claim 7, at least some of said exposed surfaces extending downwardly into said receptacle means to an extent requisite for partial immersion in the condensate accumulated therein.

9. A method of recovering solvent vapors, comprising guiding in a predetermined path a stream of air enriched with vapors of a volatile solvent having a given specific weight; cooling said stream in said path to effect condensation of the vapor in form of droplets which descend under the influence of gravity; collecting the descending droplets of condensate to form a body of recovered solvent; and at least inhibiting renewed vaporization of the recovered solvent pending reuse thereof by establishing between said body of solvent and the ambient atmosphere a seal impenetrable to the atmosphere but penetrable to the descending droplets of condensate.

10. A method as defined in claim 9, wherein the step of at least inhibiting renewed vaporization comprises floating on the surface of said body of recovered solvent a layer of liquid constituting said seal and having a lower specific gravity and lesser volatility than said solvent, to thereby prevent the latter from contact with the ambient atmosphere.